(12) United States Patent
Mehta

(10) Patent No.: US 6,383,631 B1
(45) Date of Patent: May 7, 2002

(54) RELEASE COATING AND BARRIER COATING FOR LINERLESS THERMAL LABELS AND METHOD OF MAKING

(75) Inventor: Rajendra Mehta, Dayton, OH (US)

(73) Assignee: The Standard Register Company, Dayton, OH (US)

( * ) Notice: Subject to any disclaimer, the term of this patent is extended or adjusted under 35 U.S.C. 154(b) by 0 days.

(21) Appl. No.: 09/550,193

(22) Filed: Apr. 17, 2000

(51) Int. Cl.⁷ ................................................ B32B 15/04
(52) U.S. Cl. ..................... 428/352; 427/152; 428/195; 428/353; 428/354; 428/447; 428/913; 428/914; 503/200; 503/226
(58) Field of Search ................................ 503/200, 226; 427/152, 150, 151; 428/195, 352, 353, 354, 447, 913, 914

(56) References Cited

U.S. PATENT DOCUMENTS

| | | |
|---|---|---|
| 4,424,245 A | 1/1984 | Maruta et al. |
| 4,851,383 A | 7/1989 | Fickenscher et al. |
| 4,978,415 A | 12/1990 | Jones |
| 5,292,713 A | 3/1994 | Stenzel et al. |
| 5,354,588 A | 10/1994 | Mitchell et al. |
| 5,417,783 A | 5/1995 | Boreali et al. |
| 5,437,228 A | 8/1995 | Uland |
| 5,440,001 A | 8/1995 | Griswold et al. |
| 5,508,247 A | 4/1996 | Tran et al. |
| 5,587,214 A | 12/1996 | Mitchell, Jr. |
| 5,658,661 A | 8/1997 | Mitchell, Jr. et al. |
| 5,661,099 A | 8/1997 | Mitchell, Jr. |
| 5,738,748 A | 4/1998 | Mitchell, Jr. |
| 5,792,296 A | 8/1998 | Soltysiak |
| 5,814,679 A | 9/1998 | Eckberg et al. |
| 5,840,657 A | 11/1998 | Mehta et al. |
| 5,866,261 A | 2/1999 | Kerr, III et al. |
| 6,022,050 A * | 2/2000 | Kline .......................... 283/81 |
| 6,231,922 B1 * | 5/2001 | Kline .......................... 427/208 |

* cited by examiner

Primary Examiner—Bruce H. Hess
(74) Attorney, Agent, or Firm—Killworth, Gottman, Hagan & Schaeff, L.L.P.

(57) ABSTRACT

A combination release coating and barrier coating for use on linerless thermal labels is provided in which the release coating includes an epoxy-silicone copolymer, a release modifier, and a cationic photoinitiator. The release coating provides an improved surface for direct thermal printing and good release properties from pressure sensitive adhesives. The barrier coating is preferably provided on the first and second surfaces of the label substrate to provide moisture and abrasion resistance to the substrate and to prevent adhesive failure.

11 Claims, 1 Drawing Sheet

(12) United States Patent
US 6,383,631 B1

RELEASE COATING AND BARRIER COATING FOR LINERLESS THERMAL LABELS AND METHOD OF MAKING

BACKGROUND OF THE INVENTION

This invention relates to a combination release coating and barrier coating for use on substrates such as linerless labels. More particularly, the invention relates to a release coating which provides an improved surface for direct thermal printing and good release properties from pressure sensitive adhesives, and to a barrier coating which provides moisture and abrasion resistance to the substrate surface.

The use of linerless labels has become increasingly popular in recent years as such labels do not require a separate release liner, which effectively doubles the number of labels that can be stored on a given roll or stack of labels. Typical linerless labels are disclosed in U.S. Pat. Nos. 4,851,383, 5,508,247 and 5,292,713, and generally comprise a substrate having a thermally imagable coating on one surface which may be activated to form color images. A silicone release composition is coated over the thermally imagable coating, and a pressure sensitive adhesive is included on the second surface of the substrate. The adhesive may be permanent or repositionable. By coating the silicone layer over the thermally imagable layer, the labels may be rolled or stacked without the use of a release liner. The labels may be imaged through the release coating using a thermal printer which activates the thermally imagable coating.

Silicone release coatings currently in use include coatings based on acrylate functional silicones which are cured by free radical polymerization. However, because free radical polymerizations are inhibited by the presence of oxygen, expensive nitrogen inerting is typically employed in order to obtain acceptable cure speeds. Release coatings utilizing UV curable epoxy organo polysiloxanes are also known. However, while these coatings cure rapidly, it is difficult to achieve adequate release properties when using such coatings. For example, the force required for release from the pressure sensitive adhesives must be sufficiently low to allow easy removal of the label but not so low that the labels will release or dispense prematurely. Because silicone release coatings must be formulated to provide adequate release properties, it is often difficult to print and/or write on the release coatings due to low surface energy or high contact angle.

Accordingly, there is still a need in the art for a release coating and method of making linerless thermal labels which provides a good printing surface for printing with direct thermal printers as well as providing good release properties from pressure sensitive adhesives.

SUMMARY OF THE INVENTION

The present invention meets that need by providing a release coating for substrates such as linerless labels which permits high quality thermal imaging through the coating and which provides stable release properties. In addition, the present invention provides a barrier coating which provides moisture and abrasion resistance to the label substrates and helps prevent adhesive failure of the pressure sensitive adhesives used on the substrates.

According to one aspect of the present invention, a combination release coating and barrier coating is provided for use on a substrate, where the release coating comprises an epoxy-silicone copolymer, a release modifier and a cationic photoinitiator. Preferably, the release coating comprises from about 90–98% by weight of the epoxy-silicone copolymer, from about 1 to 4% by weight of the release modifier, and from about 1 to 4% by weight of the cationic photoinitiator. Preferably, the epoxy-silicone copolymer comprises a UV curable epoxy-functional siloxane. The cationic photoinitiator is preferably selected from the group consisting of diaryl iodonium tetrakis (pentafluoro phenyl) borate salt, bis(dodecylpheryl) iodonium hexafluoroantimonate, and 4-octadecylphenyl phenyl iodonium hexa fluoroantimonate.

The barrier coating preferably comprises a grafted starch, a grafted styrene resin, poly(vinyl alcohol) and a crosslinking agent. The barrier coating may be applied to the first and/or second surfaces of the substrate. When applied to the first surface, the barrier coating functions to provide moisture and abrasion resistance to the substrate. When applied to the second surface of the substrate, the coating functions to prevent bleed-through of the pressure sensitive adhesive on the substrate which could result in adhesive failure.

A preferred method for making the linerless thermal labels of the present invention comprises the steps of a) providing a web comprising a label substrate having first and second surfaces, with the first surface including a thermally imagable coating; b) applying a barrier coating to the first, second, or both surfaces of the web; c) applying a release coating to the first surface of the web, where the release coating comprises an epoxy-silicone copolymer, a release modifier, and a cationic photoinitiator; and c) applying a pressure sensitive adhesive to the second surface of the web. Preferably, the release coating is cured by UV radiation prior to application of the pressure sensitive adhesive.

Preferably, the barrier coating is applied to the first surface of the web prior to applying the release coating. The barrier coating is preferably applied to the second surface of the web prior to applying the adhesive.

The resulting linerless label exhibits a good printing surface when printed using direct thermal printers, provides stable release properties, and exhibits moisture and abrasion resistance.

Accordingly, it is a feature of the present invention to provide a release coating for substrates such as linerless thermal labels which provides an improved surface for direct thermal printing and good release properties from pressure sensitive adhesives. It is a further feature of the invention to provide a barrier coating which provides moisture and abrasion resistance to the substrate and which prevents adhesive failure when used on a substrate including a pressure sensitive adhesive. Other features and advantages of the invention will be apparent from the following description, the accompanying drawings, and the appended claims.

DETAILED DESCRIPTION OF THE PREFERRED EMBODIMENT

Figure 1:
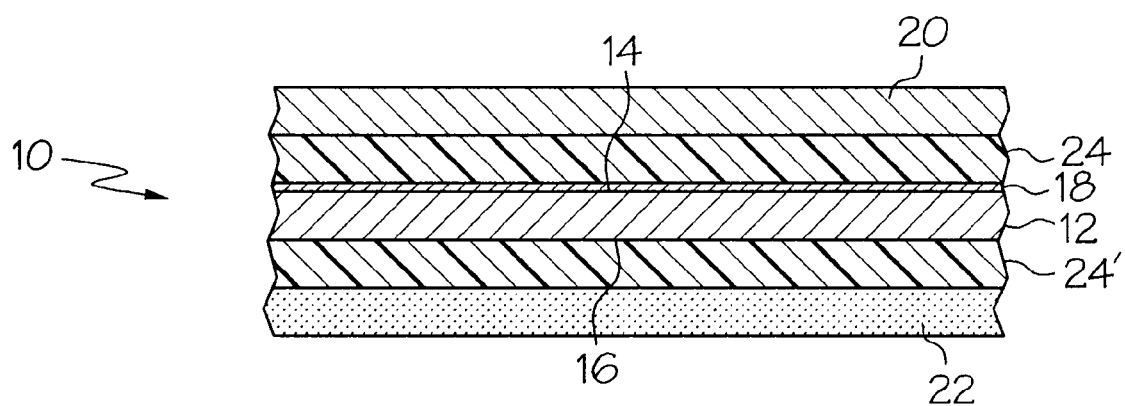
FIG. 1 is a sectional view of a label illustrating the release coating and barrier coating of the invention.

The release coating and barrier coating of the present invention may be applied to any document or record including business forms, labels, tags, or other documents in which it is desirable to eliminate the use of a release liner. The documents may comprise paper, films, or other printable substrates. Preferred substrates for use in the present invention include paper substrates having a neutral to acidic surface (pH $\leq 7.0$). Other suitable substrates include Rhinelander 2.5 mil paper.

Referring now to FIG. 1, a partial side sectional view of a linerless label 10 is shown. The label 10 is comprised of a substrate 12 having a first surface 14 and a second surface 16. The first surface 14 of the substrate is coated with a thermally imagable coating 18 comprising initially colorless color formers and color developers. Suitable thermally imagable coatings include those described in commonly assigned U.S. Pat. Nos. 5,803,505, 5,524,934, and 5,840,657, the disclosures of which are hereby incorporated by reference.

Alternatively, the substrate may comprise direct thermal label stock which already includes a thermally imagable coating on its surface. Suitable thermal label stocks for use in the present invention include Kanzaki KL-470, Kanzaki KL-370/ST95, Ricoh 120 LAM, Ricoh 130-LH-1, and Appleton T1062A, Optima T-675 (available from Appleton Papers).

As shown in FIG. 1, a barrier layer 24 overlies the thermally imagable coating 18. The barrier coating is preferably applied by a conventional flexographic printing method. By applying the barrier coating over the thermally imagable coating 18, the moisture and abrasion resistance of the substrate 12 is improved. In addition, the barrier layer renders the substrate surface acidic to enhance adhesion and crosslinking of the release coating. The barrier coating should preferably have a pH of 7 or below. The barrier coating preferably comprises a grafted starch, a grafted styrene resin, poly (viny alcohol), and a crosslinker for the poly (vinyl alcohol).

Also as shown in FIG. 1, a release coating 20 overlies the barrier coating 24. The release coating is generally applied to the substrate by any suitable coating or printing process including flexographic or gravure printing techniques. The release coating is preferably applied to provide a dry coating weight of between about 0.5 to 0.8 lbs/17"×22"×500 sheet ream. The coating is preferably applied as a 100% solids liquid.

The release coating preferably comprises an epoxy-silicone copolymer, a release modifier, and a cationic photoinitiator. A preferred epoxy-silicone copolymer is an epoxy polyorganosiloxane available from Rhodia under the designation Silcolease® PC-600. The use of the epoxy-silicone copolymer in the release coating provides several advantages including the ability to cure quickly in air without the need for nitrogen inerting. In addition, the cure rate of the epoxy-silicone release coating is much faster the cure rate of acrylic-based release coatings. In addition, the epoxy-silicone copolymer provides the release coating with excellent adhesion to paper and films, stable release values over time, and good abrasion resistance while still permitting thermal imaging through the coating.

A preferred release modifier for use in the present invention is a low release control release additive available from Rhodia under the designation Silcolease® PC-670. Such a release modifier is designed with very low polarity and surface tension similar to high molecular weight di-methyl silicones. Another suitable release modifier is Silcolease® PC-680, a tight release control release additive, also available from Rhodia. Such release coatings may be used alone or in combination.

A preferred cationic photoinitiator for use in the release coating is PC-702 (available from Rhodia), which is a 20% solids solution of diaryl iodonium tetrakis (pentrafluoro phenyl) borate salt in reaction dilution. Another suitable catalyst is UV 9380C, available from G.E. Other suitable catalysts include Bis(dodecylpheryl) iodonium hexafluoroantimonate and 4-octadecylphenyl phenyl iodonium hexa fluoroantimonate, commercially available from 3M.

A small amount of a vinyl ether monomer may also be included in the release coating, which acts as a surface modifier and which reduces the viscosity of the coating, providing faster crosslinking.

The release coating of the present invention preferably provides a release value for the labels of from about 45 to 80 gm/2 inch width when dispensed at a 90° angle. The release coating is substantially transparent so that images printed on the label may be viewed through the coating.

Also as shown in FIG. 1, a coating of a pressure sensitive adhesive 22 is applied to the second surface 16 of substrate 12. Generally, the pressure sensitive adhesive may be selected from any of several known classes of compositions including hot melt or water based pressure sensitive adhesives. The pressure sensitive adhesive may be either permanent or repositionable. Example of suitable pressure sensitive adhesive include HL-2107, HL-2203, HM-1597, all hot melt adhesives available from H.B. Fuller. Another suitable pressure sensitive adhesive is Novamelt PS 9052 US.

Another barrier coating 24' is preferably included on the second surface 16 of the substrate 10 between the substrate and the pressure sensitive adhesive 22. The barrier coating 24' is provided on the second surface of the substrate to prevent bleed-through of the adhesive 22 to the substrate, which could lead to adhesive failure.

In a preferred method of making the label, the barrier coating is applied on the first surface of direct thermal label stock, followed by the application of the release coating. The release coating is then preferably cured by a UV light source such as a UV lamp. The web is then turned over and a second barrier coating is applied followed by the application of the pressure sensitive adhesive. The adhesive is then dried. The web may then be perforated if desired and wound into a roll.

In an alternative method, after application of the barrier coating and release coating to the web, and the web is chilled using conventional chill units. The coating is then cured under UV light, the web is turned over, and the barrier coating and adhesive are applied and dried. The web is then chilled again, and the web is perfed and then wound. The chilling steps function to lower the temperature of the paper after application of the release coating and adhesive. As thermal substrates are very sensitive to heat, the chilling steps ensure that the thermally imagable coating will not prematurely activate.

In order that the invention may be more readily understood, reference is made to the following example which is intended to illustrate the invention, but not limit the scope thereof.

EXAMPLE 1

The following materials were combined to produce a release coating formulation:

| Formula A | |
|---|---|
| | Weight % |
| Epoxy-silicone copolymer[1] | 96.5 |
| Release modified[2] | 1.4 |
| Cationic photoinitiator[3] | 2.1 |

[1]PC-600 from Rhodia

-continued

Formula A

| | Weight % |
|---|---|
| ²PC-670 from Rhodia | |
| ³PC-702 from Rhodia | |

Formula B

| | Weight % |
|---|---|
| Epoxy-silicone copolymer¹ | 94.5 |
| Release modifier² | 2.5 |
| Cationic photoinitiator³ | 3.0 |

¹PC-600 from Rhodia
²PC-670 from Rhodia
³UV-9380C from G.E.

Formula C

| | Weight % |
|---|---|
| Epoxy-silicone copolymer¹ | 92.80 |
| Vinyl ether⁴ | 2.0 |
| Release modifier² | 3.24 |
| Cationic photoinitiator³ | 1.96 |

¹PC-600 from Rhodia
²PC-670 from Rhodia
³3M
⁴ISP

Barrier coating Formulation

| | Weight % |
|---|---|
| Grafted starch | 68.9 |
| Grafted styrene-Bontadicue | 19.8 |
| Polyvinyl Alcohol | 10.0 |
| Crosslinker for PVA | 0.4 |
| Antioxidant | 0.4 |
| Fluorescent indicator | 0.4 |
| Surfactant | 0.1 |

Formulas A and B above were coated (along with the barrier coating) on labels and tested for abrasion resistance using a Taber Abraser Tester Model No. 503 (TAPPI Method T476-M51) to simulate abrasion which may occur during normal use. Bar codes, and the numbers one and ten were checked using the PCS Quick-Check 500 for bar code readability before testing abrasion resistance. The coated labels were compared with a linerless thermal label commercially available from Moore Business Forms, Inc. (prior art sample #1) and a linerless thermal label commercially available from Media Solutions, Inc. (prior art sample #2). The results are shown below in Table 1.

TABLE 1

| Sample | Abrasion Test |
|---|---|
| Prior art sample #1 | Failed at 230 cycles |
| Prior art sample #2 | Failed at 190 cycles |

TABLE 1-continued

| Sample | Abrasion Test |
|---|---|
| Formula A | Failed at 570 cycles |
| Formula B | Failed at 470 cycles |

The samples were also subjected to accelerated aging tests in an oven at 120° F. for 55 days. Table 2 below shows the readings taken before and after aging using a PCS Quick Check bar code tester where the minimum reading is set at C and any reading below C is considered a failure.

TABLE 2

| Sample | Reading before Testing | Reading after 55 days in 120° F. oven |
|---|---|---|
| Prior art sample | C | D (Failed) |
| Formula A | B | C |
| Formula B | B | C |

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. In combination, a release coating and a barrier coating applied on the surface of a substrate, said release coating comprising an epoxy-silicone copolymer, a release modifier and a cationic photoinitiator.

2. The combination of claim 1 wherein said barrier coating comprises a grafted starch, a grafted styrene resin, poly(vinyl alcohol) and a crosslinking agent.

3. The combination of claim 1 wherein said release coating comprises from about 90–98% by weight of said epoxy-silicone copolymer, from about 1 to 4% by weight of said release modifier, and from about 1 to 4% by weight of said cationic photoinitiator.

4. The combination of claim 1 wherein said epoxy-silicone copolymer comprises a UV curable epoxy-functional siloxane.

5. The combination of claim 1 wherein said cationic photoinitiator is selected from the group consising of diaryl iodonium tetrakis (pentafluoro phenyl) borate salt, bis (dodecylpheryl) iodonium hexafluoroantimonate, and 4-octadecylphenyl phenyl iodonium hexa fluoroantimonate.

6. A method of making linerless thermal labels comprising the steps of:
   a) providing a web comprising a substrate, said web having first and second surfaces with said first surface including thereon a thermally imagable coating;
   b) applying a barrier coating to said first, second, or both surfaces of said web;
   c) applying a release coating to said first surface of said web, said release coating comprising an epoxy-silicone copolymer, a release modifier, and a cationic photoinitiator; and
   d) applying a pressure sensitive adhesive to said second surface of said web.

7. The method of claim 6 wherein said barrier coating is applied to said second surface of said web prior to applying said adhesive.

8. The method of claim 6 wherein said barrier coating is applied to said first surface of said web prior to applying said release coating.

9. The method of claim 6 wherein said barrier coating comprises grafted starch, grafted styrene, polyvinyl alcohol and a crosslinking agent.

10. A linerless label comprising:
- a substrate having first and second major surfaces, said first surface of said substrate including on one or more selected portions thereof a thermally imagable coating;
- a barrier coating on said first surface of said substrate which overlies said thermally imagable coating;
- a release coating on said first surface of said substrate which overlies said barrier coating, said release coating comprising an epoxy-silicone copolymer, a release modifier, and a cationic photoinitiator;
- a barrier coating on said second surface of said substrate; and
- a pressure sensitive adhesive on said second surface of said substrate which overlies said barrier coating.

11. A linerless continuous series of labels comprising:
- a web having a series of individual labels, said web comprising first and second major surfaces, said first surface of said web including on one or more selected portions thereof a thermally imagable coating;
- a barrier coating on said first surface of said web which overlies said thermally imagable coating;
- a release coating on said first surface of said web which overlies said barrier coating, said release coating comprising an epoxy-silicone copolymer, a release modifier, and a cationic photoinitiator;
- a barrier coating on said second surface of said web; and
- a pressure sensitive adhesive coated on the second surface of said web which overlies said barrier coating.

* * * * *